Jan. 30, 1968        J. A. LACKEY        3,366,418

DUMP TRUCK CONSTRUCTION

Filed Feb. 21, 1966        2 Sheets-Sheet 1

INVENTOR.
JOSEPH A. LACKEY
BY *M. A. Hobbs*
ATTORNEY

Jan. 30, 1968   J. A. LACKEY   3,366,418
DUMP TRUCK CONSTRUCTION

Filed Feb. 21, 1966   2 Sheets-Sheet 2

INVENTOR.
JOSEPH A. LACKEY
BY M. A. Hobbs
ATTORNEY

United States Patent Office 3,366,418
Patented Jan. 30, 1968

3,366,418
DUMP TRUCK CONSTRUCTION
Joseph A. Lackey, 2450 Blake Road,
Portage, Ind. 46368
Filed Feb. 21, 1966, Ser. No. 528,743
4 Claims. (Cl. 298—7)

ABSTRACT OF THE DISCLOSURE

A dump truck bed having a bottom structure with a rear edge and a tail gate, and the plate-like lip pivotedly attached to the rear end of the bed at the bottom of the tail gate. The lip is so attached to the rear of the truck that it will pivot freely when the truck is moving or the bed is dumping its load.

In one form of conventional dump trucks, the bed is provided with a pivoted tail gate which, when released during the dumping operation, swings outwardly at the bottom on hinges or pivot pins located at the top of the rear end of the bed as the bed is tilted in dumping the load. A lip is usually provided beneath the lower edge of the gate and is rigidly secured to or formed integrally with the bottom of the truck bed. This lip usually extends rearwardly from the closed gate several inches to a foot or more, and normally slopes slightly downwardly toward the rear. Dirt or residue from the material being hauled by the truck often collects on the lip, and the material may contain sufficient moisture to cause the material to freeze rigidly to the upper surface of the lip in freezing weather, thus forming a ridge along the lower rear side of the gate which prevents the gate from opening until the material has been chipped or scraped from the lip. This chipping or scraping operation is not only difficult and time consuming, but may be hazardous in icy weather, particularly when the truck operator does not realize that the condition exists until the bed has been elevated ready for dumping, since the load may be accidentally discharged without warning while the operator is trying to dislodge the frozen material. Further, most dump trucks are provided with an extension of the frame which forms a bumper and push bar structure at the rear of the truck directly beneath the tail gate and lip. Since the lower rear end of the bed tilts downwardly toward the push bar, any material, such as solid chunks and frozen masses on the rear end of the push bar, may be caught between the lip and push bar and prevent or seriously interfere with full tilting of the dump bed and may result in serious damage to the truck dumping mechanism or to the push bar structure. It is therefore one of the principal objects of the present invention to provide a lip structure which minimizes accumulation of debris on its upper surface, and which is so constructed and arranged that it will yield when material is caught between the lower side of the lip and the push bar and thereby avoid damage to either the bar or bed, lip or operating mechanism.

Another object of the invention is to provide a self-cleaning lip structure for dump trucks, which is simple in construction and which will perform the cleaning operation while the truck is moving, and which will automatically adjust its position to objects or obstacles contacted during the dumping operation.

Still another object is to provide a freely pivoting lip for dump truck beds which will function as the conventional lip when material is being loaded and unloaded under normal conditions and which will vibrate sufficiently while the truck is traveling to shake any foreign material from its upper surface so that it is maintained in effective operating condition with little or no service or other attention.

Further objects and advantages of the invention will become apparent from the following description and accompanying drawings, wherein.

Figure 1:
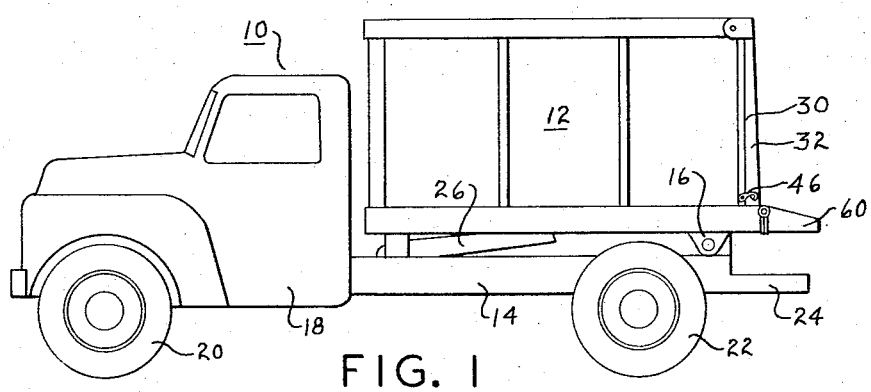
FIGURE 1 is a side elevational view of a dump truck having the present invention incorporated therein.

Referring more specifically to the drawings, numeral 10 indicates generally a dump truck having a bed 12 mounted on a frame 14 by a pivot means 16 positioned near the rear end of the frame and bed. For the purpose of the present description, the truck may be considered conventional, including the body 18, and front and rear wheels 20 and 22. The frame 14 is provided with a push bar or bumper 24 mounted rigidly on or forming a part of frame 14 and extending outwardly beyond the rear end of bed 12. A hydraulic mechanism 26 connected at one end to frame 14 and at the other end to the underside of bed 12 is provided for raising the bed to dump the material therein through the rear end tail gate opening 30. The mechanism for raising and lowering the bed is likewise conventional and may be of any suitable type, and hence will not be described in detail herein. The tail gate opening 30 is closed by a tail gate 32 having laterally extending arms 34 and 36 at the two upper corners, the two arms being pivoted to sides 38 and 40 by pins 42 extending through the arms into the upper edge of the respective side. The tail gate is locked in closed position in the embodiment shown by a latch means 46 consisting of a hook 48 pivoted by a pin 50 to the lower portion of the side walls and a pin 52 extending laterally from each side of the lower portion of tail gate 32. The bottom structure 56 for bed 12 projects a short distance beyond the rear edge of sides 38 and 40 to form a small ledge 58 beneath tail gate 32 when the gate is in closed position.

The present lip construction 60 is mounted on the rear end portion of bottom 56 of bed 12 and consists of a body portion 62 having sides 64 and 66 and back 68 joined together to form a rigid understructure for a top 70. The top is flat and rigid and may be supported on its underside by a plurality of intermediate members 72 and 74 similar to sides 64 and 66. The particular understructure for top 70 is not considered important with reference to the present invention, so long as the structure is adequate to support the load being dumped from or loaded onto bed 12 through tail gate opening 30.

The lip 60 is pivotally mounted at the rear edge of bottom 56 by a hinge construction generally indicated by numeral 80 and consisting of interlocking tubular portions 82 and 84 joined to the lip and bed bottom, respectively, and preferably formed integrally therewith. Since the floor 86 of bottom 56 and top 70 of the lip are constructed of heavy plate metal material, the hinge may be formed by merely cutting out the space for the interlocking tubular portions and forming the remaining portions into the tubular shape, as clearly seen in FIGURE 3. The tubular portions 82 and 84 are retained in their interlocking pivoted positions by a rod 88 extending through the holes in the tubular portions from one end of the lip to the other, thus forming an effective hinge for firmly supporting lip 60 in pivotal relationship to bottom 56 of bed 12. The rear edge of the upper surface of lip 60 is substantially on the same plane as floor 86 of bottom 56.

Figure 2:
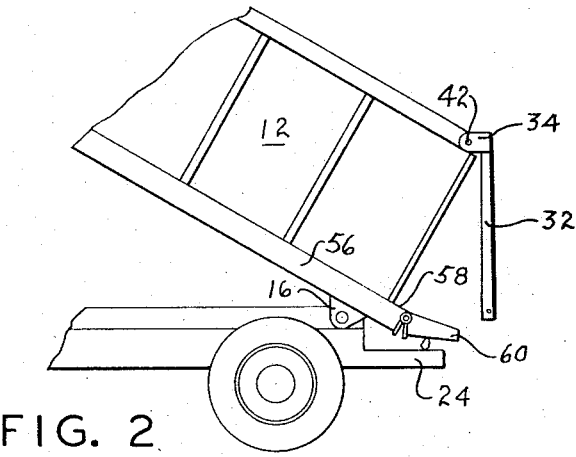
FIGURE 2 is a fragmentary side elevational view of the truck shown in FIGURE 1, illustrating the manner in which the present invention operates.
Figure 3:
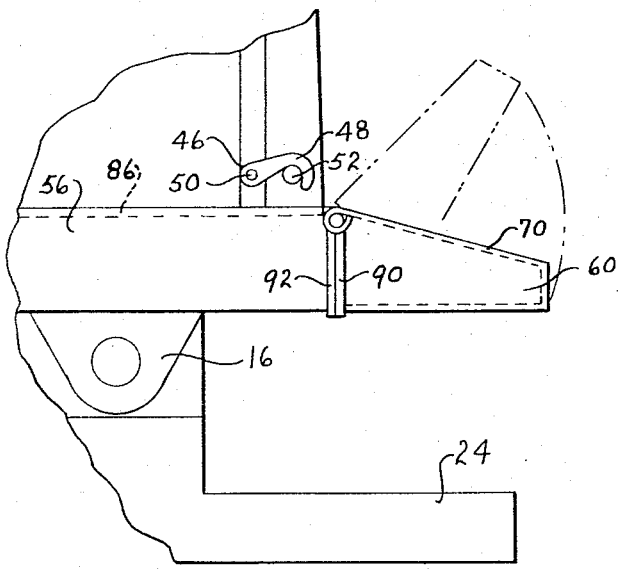
FIGURE 3 is an enlarged fragmentary side elevational view of the present invention, illustrating it in greater detail.
Figure 4:
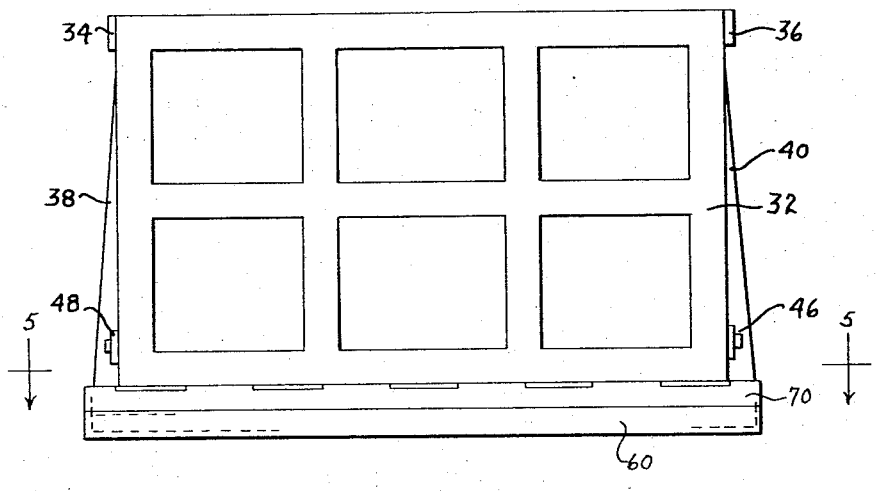
FIGURE 4 is a rear elevational view of the bed of the dump truck shown in the preceding figures.
Figure 5:
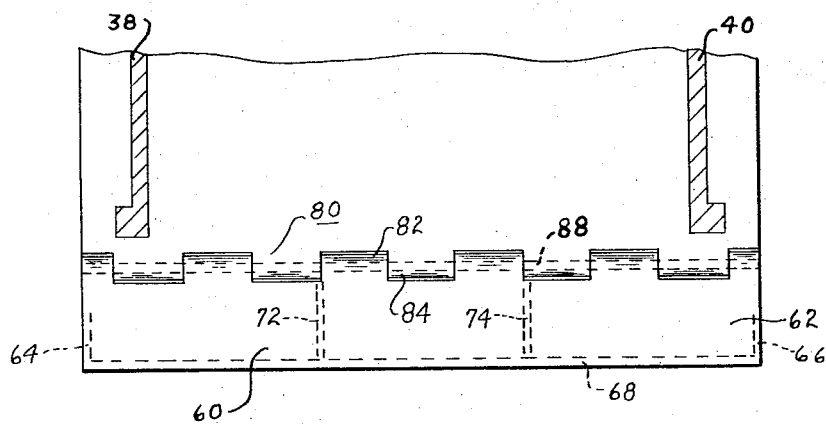
FIGURE 5 is a fragmentary partial cross sectional and plan view of the dump truck bed shown in the preceding figures, the section being taken on line 5—5 of FIGURE 4.

The lip 60 is retained in its normal operating position, as illustrated in FIGURES 1 and 3, by the edge of sides 64 and 66 and the intermediate support members, such as 72 and 74, abutting against the rear edge of bottom 56. As shown in FIGURE 3, the forward edges of members 64 and 66 and the adjacent rear edges of bottom 56 are preferably provided with members 90 and 92 extending the full length of the lip and full width of the bed and preferably welded to the respective parts to form a rigid structure with those parts. The weight placed on the lip is transmitted through member 92 to the rear edge of bottom 56. The hinge 80 permits the lip to pivot from the position shown in FIGURES 1 and 2 to the position shown in broken lines in FIGURE 3, without any interference from gate 32 when it is in its closed position, or when it has been swung toward its opened position sufficiently for the lower edge thereof to clear the upper edge of lip 60.

In the operation of the truck with the present pivoted lip, the truck and bed are used in the conventional manner for loading and unloading material, the tail gate 32 being unlatched and permitted to swing open from the position shown in FIGURE 1 to the position shown in FIGURE 2. If no obstacle is encountered by the lip, it remains in its extended position with the forward edge thereof seated against the rear side of bottom 56, i.e., with member 90 in contact with member 92. If any object of substantial size is caught between the upper side of push bar 24 and the lower side of the lip, as illustrated in FIGURE 2, the lip will pivot upwardly rather than transmit the force onto the bed operating structure, thereby preventing the bed pivoting structure from being damaged. When the bed is lowered, i.e., tilted downwardly, the rear edge of bottom 46 is raised, thereby permitting the lip to return to its normal position.

In the event any mateiral falls on the lip while the bed is being loaded, or accumulates on the lip after the bed has been dumped, the vibration, jostling and oscillation permitted by hinge 80 are sufficient to dislodge the material from the lip. This self-cleaning action is very advantageous in the operation of the truck in freezing weather conditions, since the material falling onto the lip is effectively removed by the vibration and oscillation of the lip. Hence, it is not necessary for the truck operator to inspect and clean the lip before the material is discharged from the bed.

While only one embodiment of the present invention has been described in detail, various changes and modifications may be made, including the use of various types of hinges or pivot structures for attaching the lip to the rear edge of bottom 56, and the particular shape and structure of the lip may be varied to satisfy requirements. The pivoted lip construction may be used on trailer type dump trucks and other similar vehicles.

I claim:

1. In combination with a dump truck bed having a bottom structure with a rear edge and a tail gate, a lip comprising a plate-like member extending rearwardly from the lower edge of said tail gate and substantially the full width of said bed and sloping downwardly and rearwardly from the tail gate of the bed, a structure supporting said member, a means pivoting said member to the rear edge of the bottom structure of said bed and being so constructed and arranged that the lip may pivot freely when the truck is moving and the bed is dumping its load, and means on said lip engaging a means on said bed for yieldably holding said lip in a predetermined lower position including an abutment-like structure disposed beneath said plate-like member and engaging means supported by the rear end of the bed bottom.

2. The dump truck bed structure as defined in claim 1, in which the forward upper surface of said plate-like member is on substantially the same plane as the upper surface of the bottom of said bed.

3. The dump truck bed structure as defined in claim 1, in which the pivot means consists of a hinge type structure having interlocking tubular members alternately joined to the lip and to the bottom of the bed and held together by a shaft extending through said tubular members.

4. The dump truck bed structure as defined in claim 1, in which the pivot means consists of a hinge-like member extending substantially the full width of the bed along the rear edge thereof.

References Cited

UNITED STATES PATENTS

| | | | |
|---|---|---|---|
| 2,020,451 | 11/1935 | Atwell | 296—51 |
| 2,115,816 | 5/1938 | Koerner | 296—57 |
| 2,394,153 | 2/1946 | Correa | 298—18 |
| 3,235,310 | 2/1966 | Medley | 298—23 |

RICHARD J. JOHNSON, *Primary Examiner.*